US011138380B2

(12) United States Patent
Mwarabu et al.

(10) Patent No.: US 11,138,380 B2
(45) Date of Patent: Oct. 5, 2021

(54) IDENTIFYING SEMANTIC RELATIONSHIPS USING VISUAL RECOGNITION

(71) Applicant: International Business Machines Corporation, Armonk, NY (US)

(72) Inventors: Chris Mwarabu, Holly Springs, NC (US); David Contreras, Willow Spring, NC (US); Roberto Delima, Apex, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/437,129

(22) Filed: Jun. 11, 2019

(65) Prior Publication Data

US 2020/0394267 A1   Dec. 17, 2020

(51) Int. Cl.
  *G06F 40/30*   (2020.01)
  *G06N 20/00*   (2019.01)
  (Continued)

(52) U.S. Cl.
  CPC ............ *G06F 40/30* (2020.01); *G06F 40/205* (2020.01); *G06F 40/253* (2020.01); *G06N 20/00* (2019.01);
  (Continued)

(58) Field of Classification Search
  CPC ............... G06F 17/2785; G06F 17/274; G06F 17/2705; G06T 2200/24; G06T 2210/12; G06T 11/203; G06N 20/00
  See application file for complete search history.

(56) References Cited

U.S. PATENT DOCUMENTS

| 9,965,461 B2 | 5/2018 | Jackson |
| 2010/0232686 A1* | 9/2010 | Dewan ..................... G06T 7/12 |
| | | 382/159 |

(Continued)

FOREIGN PATENT DOCUMENTS

| WO | 2012047214 A2 | 4/2012 |
| WO | 2016055895 A1 | 4/2016 |

OTHER PUBLICATIONS

Szegedy et al., "Rethinking the Inception Architecture for Computer Vision", arXiv preprint, Dec. 11, 2015, 10 pages.

(Continued)

*Primary Examiner* — Kevin Ky
(74) *Attorney, Agent, or Firm* — James L. Olsen

(57) ABSTRACT

Aspects of the present disclosure relate to identifying semantic relationships. Natural language content is received. A part of speech is determined for respective terms within the natural language content. A semantic type is determined for each of two or more terms within the natural language content. A parse tree representation containing a plurality of nodes is then generated based on the natural language content, each of the plurality of nodes corresponding to at least one term within the natural language content, wherein visual characteristics of respective nodes of the plurality of nodes within the parse tree representation depend on the part of speech and semantic type of the respective terms. A bounding box identifying a semantic relationship is then generated around a set of nodes on the parse tree representation, the set of nodes including the two or more terms.

18 Claims, 9 Drawing Sheets

(51) Int. Cl.
*G06T 11/20* (2006.01)
*G06F 40/205* (2020.01)
*G06F 40/253* (2020.01)

(52) U.S. Cl.
CPC ........ *G06T 11/203* (2013.01); *G06T 2200/24* (2013.01); *G06T 2210/12* (2013.01)

(56) References Cited

U.S. PATENT DOCUMENTS

| | | | |
|---|---|---|---|
| 2015/0154164 A1* | 6/2015 | Goldstein | G06F 40/103 715/229 |
| 2016/0117574 A1* | 4/2016 | Mei | G06F 16/5838 382/159 |
| 2018/0052818 A1* | 2/2018 | Bethard | G06F 16/3344 |
| 2018/0075011 A1 | 3/2018 | Allen et al. | |
| 2018/0101598 A1 | 4/2018 | Allen et al. | |
| 2018/0129967 A1* | 5/2018 | Herreshoff | G06N 5/02 |

OTHER PUBLICATIONS

Redmon et al., "You Only Look Once: Unified, Real-Time Object Detection", arXiv preprint, May 9, 2016, 10 pages.
Ren et al., "Faster R-CNN: Towards Real-Time Object Detection with Region Proposal Networks", arXiv preprint, Jan. 6, 2016, 14 pages.
Collobert et al., "Natural language processing (almost) from scratch", Journal of Machine Learning Research 12, Submitted Jan. 2010; Revised Nov. 2010; Published Aug. 2011, pp. 2493-2537.
Szegedy et al., "Deep Neural Networks for Object Detection", Advances in neural information processing systems, 2013, 9 pages, no date available.
Kalchbrenner et al., "A Convolutional Neural Network for Modelling Sentences", arXiv preprint, Apr. 8, 2014, 11 pages.
Kim, Y., "Convolutional Neural Networks for Sentence Classification", arXiv preprint, Sep. 3, 2014, 6 pages.
Dai et al., "Convolutional Feature Masking for Joint Object and Stuff Segmentation", 2015 IEEE Conference on Computer Vision and Pattern Recognition, pp. 3992-4000, no date available.
Mell et al., "The NIST Definition of Cloud Computing", Recommendations of the National Institute of Standards and Technology, Sep. 2011, 7 pages.
Mwarabu et al., "Identifying Spans Using Visual Recognition", U.S. Appl. No. 16/393,145, filed Apr. 24, 2019.

\* cited by examiner

IDENTIFYING SEMANTIC RELATIONSHIPS USING VISUAL RECOGNITION

BACKGROUND

The present disclosure relates generally to natural language processing.

A major challenge to analyzing unstructured text is the variability between text documents. For example, there may be significant variation in formatting (e.g., ordered and unordered lists, different data fields, etc.), writing style (e.g., poor grammar, different acronyms, fragments, run on sentences, etc.), legibility (e.g., different hand writing, text printed on different media, etc.) and noise (e.g., content not relevant to be analyzed) between text documents. These issues are further amplified if the amount of data to be analyzed is limited (e.g., electronic medical records (EMRs) may be unavailable for analysis due to relevant restrictions). Building a normalized representation of data from unstructured text is critical to analyze such unstructured text.

SUMMARY

Aspects of the present disclosure relate to a method, system, and a computer program product for semantic relationship identification. Natural language content can be received. A part of speech can be determined for respective terms within the natural language content. A semantic type can be determined for each of two or more terms within the natural language content. A parse tree representation containing a plurality of nodes can then be generated based on the natural language content, each of the plurality of nodes corresponding to at least one term within the natural language content, wherein visual characteristics of respective nodes of the plurality of nodes within the parse tree representation depend on the part of speech and semantic type of the respective terms. A bounding box identifying a semantic relationship can then be generated around a set of nodes on the parse tree representation, the set of nodes including the two or more terms.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
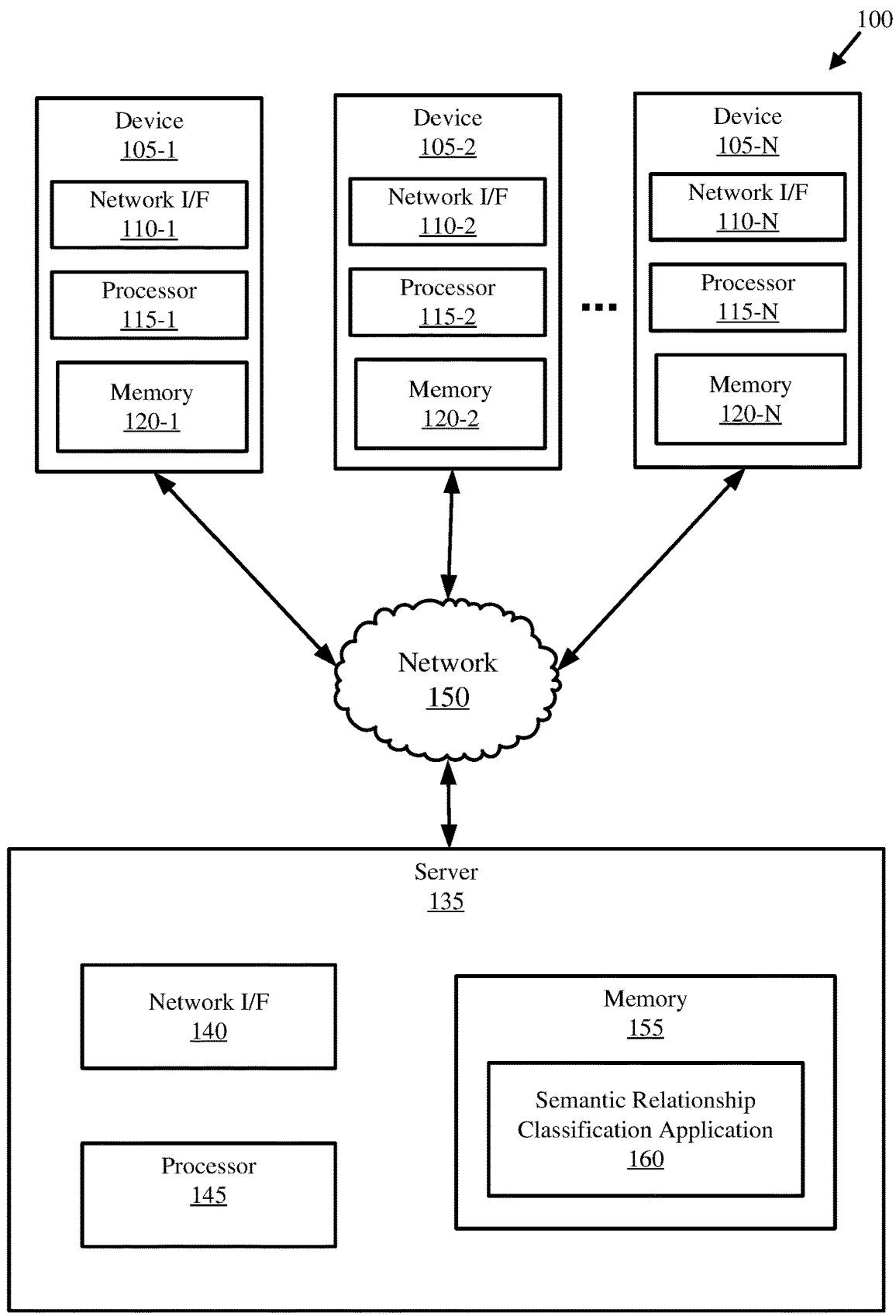
FIG. 1 is a block diagram illustrating an example computing environment in which illustrative embodiments of the present disclosure can be implemented.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward semantic relationship identification, and more specifically, to semantic relationship identification using visual recognition. While the present disclosure is not necessarily limited to such applications, various aspects of the present disclosure may be appreciated through a discussion of various examples using this context.

Semantic types define the meaning of terms within natural language content. A portion of natural language content may have a plurality of semantic types for each word, value, phrase, etc. For example, in the sentence "The doctor intravenously administered 0.5 mL of 1:10,000 adrenaline.", the word "intravenously" can have the semantic type "administration route," the value "0.5 mL" can have the semantic type "volume," the ratio "1:10,000" can have the semantic type "concentration," and the word "adrenaline" can have the semantic type "drug." Though the meaning (e.g., semantic type) of each term may be defined, the semantic relationship between the semantic types may not be. In most cases, a user is required to manually define these relationships. For example, following the example above, by gleaning the sentence and the respective semantic types, the user may classify the semantic types "administration route," "volume," "concentration," and "drug" with the semantic relationship "drug administration plan."

In the context of medical data (e.g., electronic medical records (EMRs)), identifying semantic relationships between semantic types can aid in diagnosis and treatment of patients. Manual identification of semantic relationships is inefficient with respect to the vast amount of available medical data. As such, there exists a need to rapidly and automatically determine (e.g., identify, classify, ascertain, etc.) semantic relationships between semantic types within natural language content.

Aspects of the present disclosure address the aforementioned issues by enabling the identification of semantic relationships within natural language content using visual recognition. Natural language content can be received. A part of speech and semantic type can be determined for respective terms within the natural language content. A parse tree representation containing a plurality of nodes can then be generated based on the natural language content, each of the plurality of nodes corresponding to at least one term within the natural language content, wherein visual characteristics of respective nodes of the plurality of nodes within the parse tree representation depend on the part of speech and semantic type of the respective terms. A bounding box identifying a semantic relationship can then be generated around a set of nodes on the parse tree representation by a machine learning model.

In embodiments, the machine learning model can be trained based on supervised learning data including pre-classified parse trees (e.g., parse trees having bounding boxes identifying particular semantic relationships corresponding to semantic type groupings). In embodiments, the semantic type grouping which the bounding box encompasses can be mapped to a set of words within the natural language content and transmitted (e.g., to a graphical user interface (GUI) or to a device over a network) along with the identification of the semantic relationship.

As discussed herein, a "term" can refer to a word, phrase, value, variable, ratio, name, etc. A "node" can refer to an item of a parse tree representation. A node may include a term or a set of terms. A "bounding box" can refer to a boundary that encompasses one or more nodes within a parse tree representation. In some embodiments, a bounding box can be visually drawn on a parse tree representation. In some embodiments, a bounding box may be a contour, shade, or texture encompassing one or more nodes on the parse tree representation. In some embodiments, a bounding box can be a table, matrix, or other data structure configured to compartmentalize data. A "semantic type" can refer to a defined meaning of a term. A "semantic relationship" can refer to a defined meaning between two or more semantic types. A "semantic type grouping" can refer to two or more semantic types which may be related through a semantic relationship.

Turning now to the Figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, eye-tracking device, wearable device, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a semantic relationship classification application 160. The semantic relationship classification application 160 can be configured to classify semantic relationships between semantic types within natural language content (e.g., unstructured textual data received over network 150). To do so, the semantic relationship classification application 160 can first be configured to convert natural language content into a parse tree data structure. The parse tree data structure can be structured to include visually distinguishable nodes (e.g., for each term) based on parts of speech (e.g., adjective, noun, adverb, pronoun, verb, etc.) and semantic types (e.g., see FIG. 4). The semantic relationship classification application 160 can then be configured to analyze the parse tree data structure to classify a semantic relationship for one or more semantic type groupings (e.g., two or more nodes with classified semantic types) using a visual recognition machine learning algorithm (e.g., a region-based convolutional neural network (R-CNN)). In embodiments, the machine learning algorithm can be trained using supervised learning data (e.g., a ground truth generated by pre-classified parse tree data structures that indicate various semantic relationships between semantic types). In embodiments, pre-classifying a parse tree data structure can include drawing bounding boxes indicative of semantic relationships around nodes having particular semantic types.

Though this disclosure may pertain to the collection of personal data (e.g., EMRs), it is noted that in embodiments, users opt-in to the system. In doing so, they are informed of what data is collected and how it will be used, whether any collected personal data may be encrypted while being used, that the users can opt-out at any time, and whether if they opt-out, any personal data of the user is deleted. Further, for any sensitive data (e.g., health related records, financial information, etc.), the handling of the data will be managed according to relevant rules and restrictions.

In embodiments, data associated with the semantic relationship classification application 160 can be transmitted to the devices 105 on a push or pull basis. Further, in embodiments, the semantic relationship classification application 160 can be installed directly on the devices 105, or alternatively, provisioned to the devices 105 over the network 150 such that installation is not necessary.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
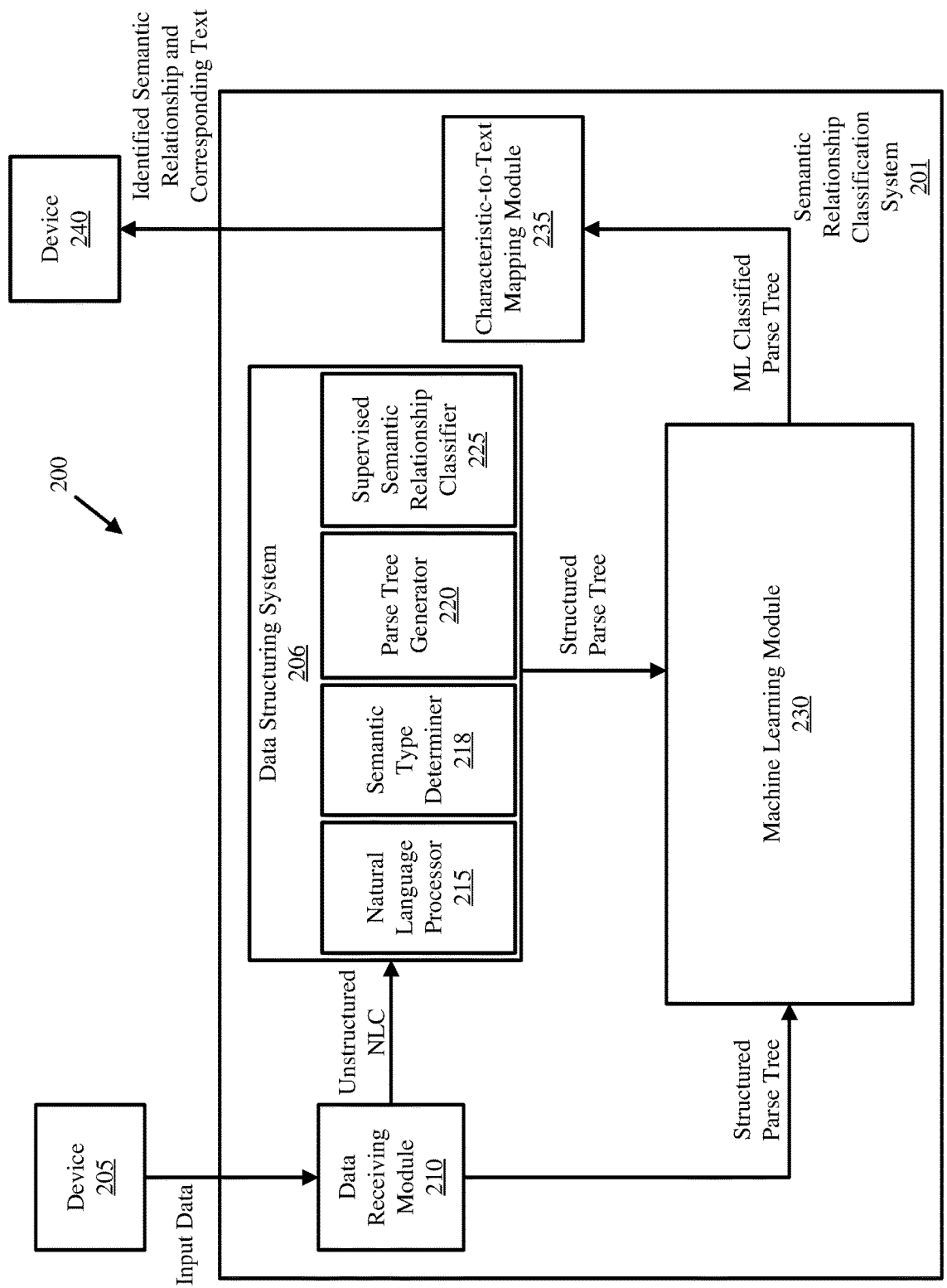
FIG. 2 is a block diagram illustrating an example semantic relationship classification system, in accordance with embodiments of the present disclosure.

FIG. 2 is a block diagram illustrating an example computing environment 200 in which illustrative embodiments of the present disclosure can be implemented. The computing environment 200 includes a device 205, a device 240, and a semantic relationship classification system 201. The semantic relationship classification system 201 (e.g., which may be the same as, or substantially similar to, semantic relationship classification application 160 of FIG. 1) includes a data receiving module 210, a data structuring system 206, a machine learning module 230, and a characteristic-to-text mapping module 235. In embodiments, the data receiving module 210, data structuring system 206, machine learning module 230, and characteristic-to-text mapping module 235 can include processor executable instructions that can be executed by a dedicated or shared processor using received inputs (e.g., from devices 205 and 240).

Consistent with various embodiments, the data receiving module 210 can be configured to receive data from the device 205 (e.g., devices 105 of FIG. 1). Data received by the data receiving module 210 can include, but is not limited to, images (e.g., images of doctor notes, prescriptions, receipts, etc.), electronic documents (e.g., electronic medical records, tax forms, contracts, judicial texts, lab reports, etc.), website data (e.g., insurance website data, hospital website data, social media posts etc.), audio data, and/or video data. In some embodiments, the data receiving module 210 can be configured to reformat, tag, or otherwise process the data into a form compatible with the data structuring system 206 (e.g., plaintext) or the machine learning module 230 (e.g., a structured parse tree).

In embodiments, the input data received by the data receiving module 210 can include unstructured natural language content (NLC), which can be forwarded to the data structuring system 206 for processing. In embodiments, the input data received by the data receiving module 210 can include structured parse trees (e.g., pre-classified and/or unclassified) to be forwarded to the machine learning module 230. Pre-classified structured parse trees can be used to train the machine learning module 230 (e.g., using supervised learning) and unclassified structured parse trees can be classified by the machine learning module 230 (e.g., after the machine learning module is sufficiently trained).

Unstructured NLC received by the data structuring system 206 can first be ingested by a natural language processor 215. The natural language processor 215 can be configured to perform various methods and techniques for analyzing natural language content (e.g., syntactic analysis, semantic analysis, part of speech tagging, etc.). The natural language processor 215 can be configured to recognize and analyze any number of natural languages. In embodiments, the natural language processor 215 can be configured to parse passages of documents (e.g., doctor notes, medical reports, billing information, tax documents, etc.). The natural language processor 215 can include functionalities including tokenization, part-of-speech tagging, slot name tagging, feature tagging, and/or syntactic relationship identification.

In some embodiments, the natural language processor 215 can be configured to perform lexical analysis. The natural language processor 215 can convert a sequence of characters into a sequence of tokens. A token can be a string of characters included in an electronic input document and categorized as a meaningful symbol. Further, in some embodiments, the natural language processor 215 can identify word boundaries in an electronic document and can break text passages within the document into their component text elements, such as words, multiword tokens, numbers, and punctuation marks. In some embodiments, the natural language processor 215 can receive a string of characters, identify the lexemes in the string, and categorize them into tokens.

Consistent with various embodiments, the natural language processor 215 can be a computer module that marks up a word in passages to correspond to a particular part of speech, slot name, and/or feature. The natural language processor 215 can ingest a passage or other text in natural language and assign a part of speech, slot name, and/or feature to each word or other token. The natural language processor 215 can determine the part of speech, slot name, and/or feature to which a word (or other text element) corresponds based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processor 215 can populate a text index, a triplestore, or a relational database (RDB) to enhance the contextual interpretation of a word or term.

Examples of parts of speech that can be assigned to words include, but are not limited to, nouns, verbs, adjectives, adverbs, and the like. Examples of other part of speech categories that natural language processor 215 can assign include, but are not limited to, comparative or superlative adverbs, wh-adverbs, conjunctions, determiners, negative particles, possessive markers, prepositions, wh-pronouns, qualifiers, modal verbs, subject infinitives, and the like. Examples of slot names include, but are not limited to, top, subject (subj), indirect object (iobj), direct object (obj), predicate complement (pred), auxiliary complement (auxcomp), complement (comp), n-nouns, n-adjectives, and the like. Examples of features include, but are not limited to, verb features (e.g., sayv (verb of saying), sta (stative verb), yen (past principle), vfin (finite verb), vfut (future tense), vind (indicates mood), ving (present participle), vpast (past tense), etc.), noun features (e.g., acc (accusative), cn (common noun), dy (day), f (feminine), h (human), indef (indefinite pronoun), etc.) adjective features (e.g., adjnoun, comp (comparative), superl (superlative), etc.), adverb features, determiner features, qualifier features, and preposition features. In some embodiments, the natural language processor 215 can tag or otherwise annotate tokens of a passage with part of speech, slot name, and feature categories.

Consistent with various embodiments, the natural language processor 215 can be a computer module that can be configured to identify syntactic relationships in a passage composed of tokens. The natural language processor 215 can determine the grammatical structure of sentences such as, for example, which groups of words are associated as phrases and which word is the subject or object of a verb. The syntactic relationship identifier 222 can conform to formal grammar.

Upon ingesting the NLC by the natural language processor 215, a semantic type determiner 218 can be configured to determine semantic types of text elements within the NLC. In some embodiments, the semantic type determiner 218 can be configured to receive user input manually defining semantic types for text elements. In some embodiments, semantic types can be automatically defined based on a table mapping terms to semantic types. For example, a semantic type "measurement" may be triggered based on the observation of any distance unit of measurement (e.g., centimeters, meters, kilometers, miles, etc.). As another example, a semantic type "tumor trigger" can be triggered based on the observation of terms related to tumors (e.g., benign, malignant, words containing an "oma" ending, such as melanoma, etc.).

Figure 3:
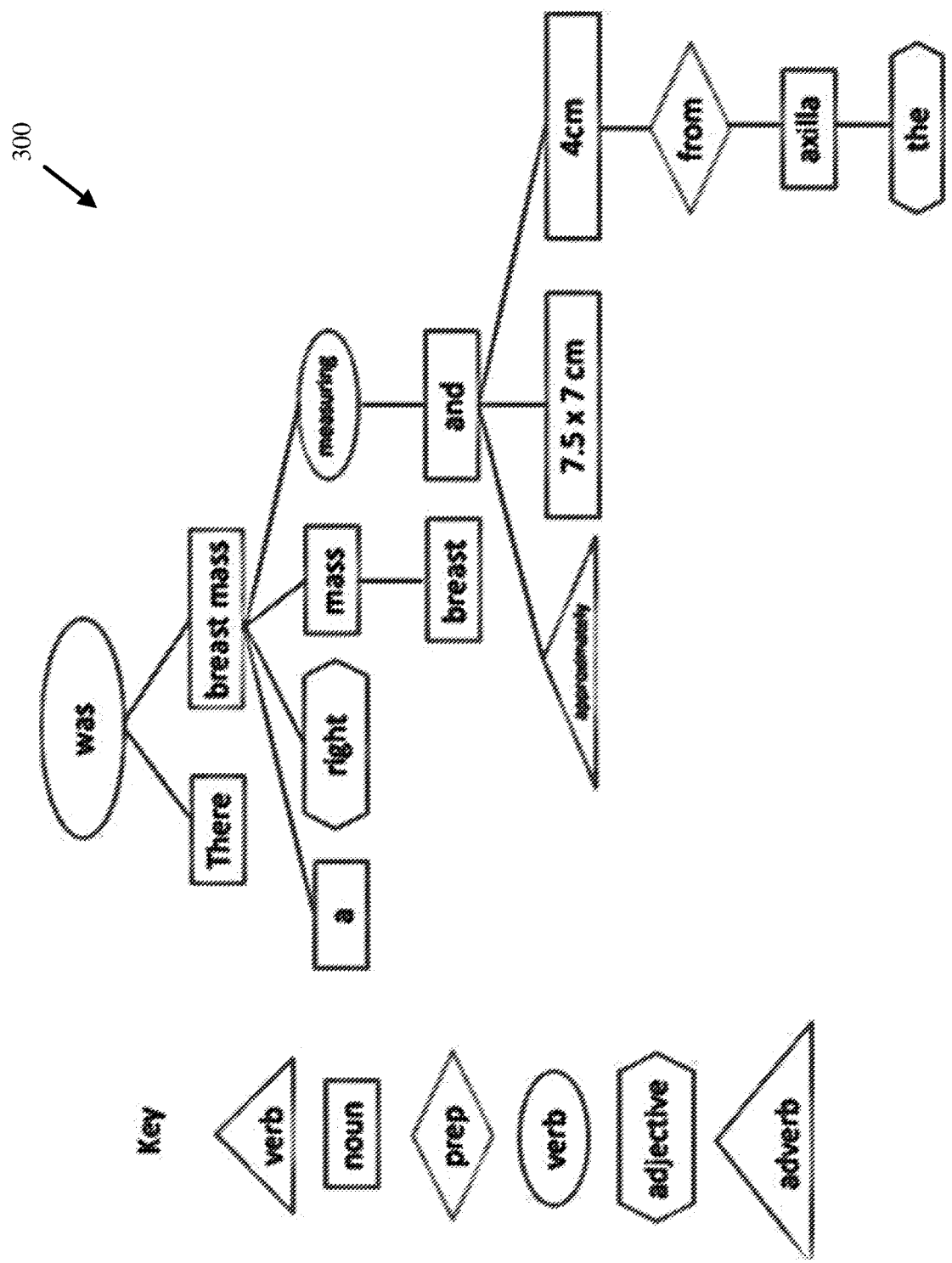
FIG. 3 is an example parse tree representation, in accordance with embodiments of the present disclosure.

The NLC is then dispatched to the parse tree generator 220. The parse tree generator 220 can be configured to generate a parse tree (e.g., a parsing tree, derivation tree, or concrete syntax tree) based on the parts of speech and semantic types associated with terms of the natural language content. An example parse tree based on part of speech tagging is depicted in FIG. 3.

Figure 4:
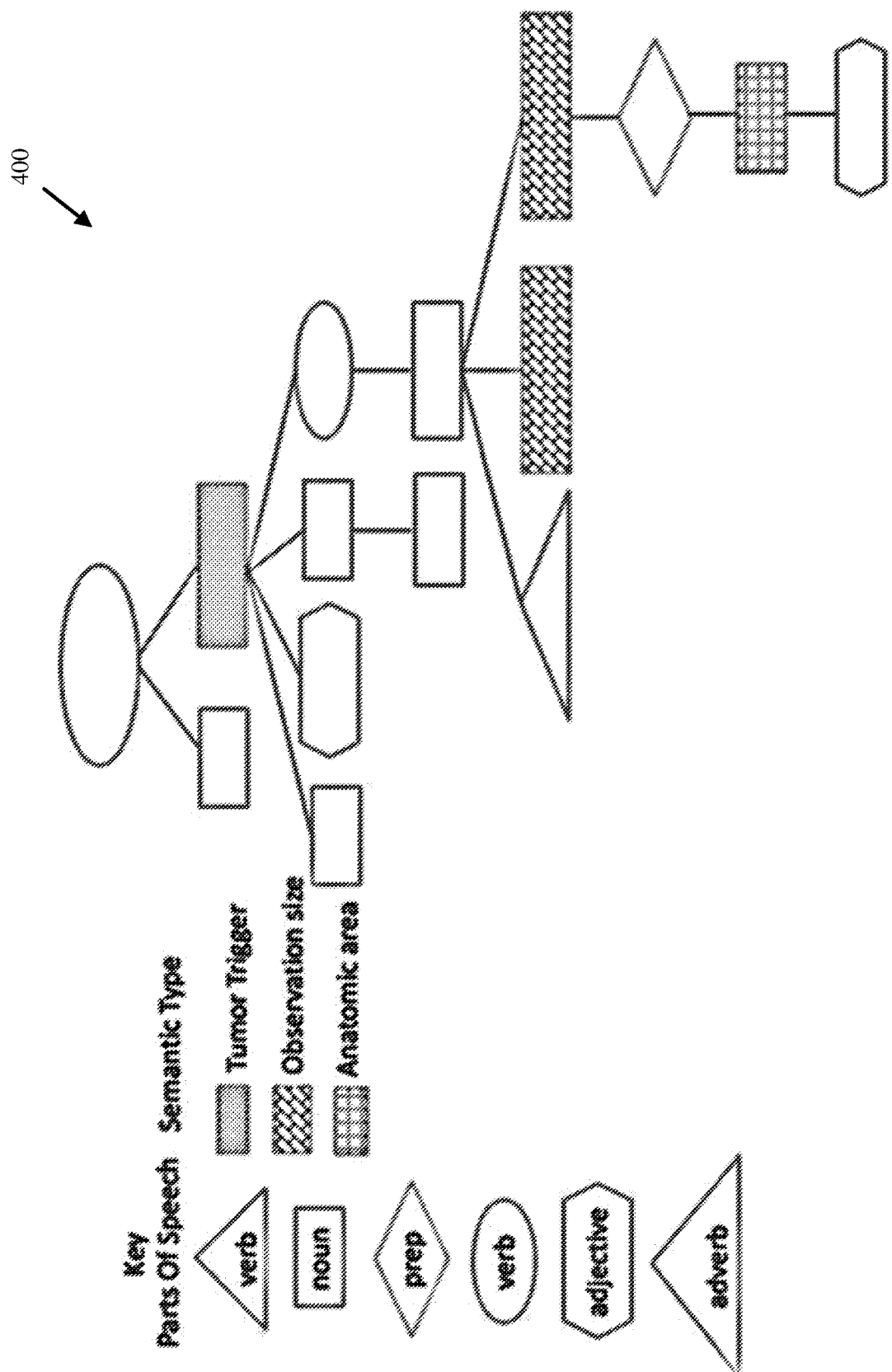
FIG. 4 is an example of a visually distinguishable parse tree representation, in accordance with embodiments of the present disclosure.

In embodiments, the parse tree generator 220 can be configured to generate visually distinguishable characteristics for each part of speech and semantic type. Terms within the parse tree can then be replaced by such visually distinguishable characteristics. For example, FIG. 4 depicts the parse tree of FIG. 3 with the terms replaced with visually distinguishable characteristics for corresponding parts of speech and semantic types. Visually distinguishable characteristics which can be assigned to each category of part of speech and semantic type can include, but are not limited to, shapes, colors, sizes, and textures. As depicted in FIG. 4, each part of speech has a particular shape and each semantic type has a particular texture.

The parse tree with visually distinguishable characteristics is then transmitted to a supervised semantic relationship classifier 225. The supervised semantic relationship classifier 225 can be configured to define (e.g., classify) semantic relationships for semantic types within the parse tree representation. In embodiments, the supervised semantic relationship classifier 225 classifies semantic relationships within each parse tree based on user input (e.g., a user, such as a domain expert, manually defines semantic relationships within the parse tree).

Classification can be completed by drawing bounding boxes around at least two nodes containing semantic types for which a semantic relationship is to be defined. In some embodiments, the bounding boxes can include specific visual characteristics (e.g., colors, textures, or shapes) which represent the label of the semantic relationship. For example, a first semantic relationship may be identified within a portion of the parse tree by a circular bounding box while a second semantic relationship may be identified within a portion of the parse tree by a rectangular bounding box. As another example, a first semantic relationship may be identified within a portion of a parse tree by a dashed bounding box, while a second semantic relationship may be identified within a portion of a parse tree by a solid bounding box. This can similarly be completed for a variety of textures, colors, or shapes. In embodiments, a bounding box includes a shaded, contoured, textured, etc. region on a parse tree representation that encompasses one or more nodes. In some embodiments, each bounding box may be labeled, tagged with metadata, or otherwise designed to designate the semantic relationship category to which each bounding box applies.

In embodiments, bounding boxes can be drawn on a parse tree representation containing text and then later be mapped onto the corresponding parse tree representation containing visually distinguishable nodes. This allows users and/or classification algorithms to classify semantic relationships during the supervised learning process based on the terms in each node of the parse tree.

Upon classification of the parse tree bounding boxes by the supervised semantic relationship classifier 225, each pre-classified structured parse tree (e.g., from the data structuring system 206 or directly from the data receiving module 210) can be input into the machine learning module 230 for training. The machine learning module 230 can then be configured to learn relationships between the various drawn bounding boxes and the parts of speech and semantic types the bounding boxes encompass. Algorithms used to build the machine learning model 230 can include linear regression, logistic regression, naive Bayes, neural networks (e.g., a region-based CNN), similarity learning, pattern recognition, decision trees, k-nearest neighbor, linear discriminant analysis, quadratic discriminant analysis, clustering, hidden Markov models (HMMs), conditional random fields (CRFs), and support vector machines. For example, the machine learning module 230 can utilize a region-based convolution neural network (R-CNN) to automatically draw bounding boxes designating particular semantic relationships (e.g., measurements, medical conditions, procedures, etc.) on the structured parse tree. In embodiments, numerous (e.g., hundreds, thousands, millions, etc.) pre-classified parse trees can be fed into the machine learning module 230 to train the machine learning module 230 to accurately approximate bounding box placement designating particular semantic relationships.

After the machine learning module 230 is trained (e.g., to some degree, though the machine learning module 230 may be trained further in the future), an unclassified parse tree is fed into the machine learning module 230. The machine learning module 230 can then classify the unclassified parse tree. Classification can include drawing bounding boxes around groups of nodes (e.g., terms) containing at least two semantic types which designate semantic relationships. In embodiments, multiple bounding boxes can be drawn on a single parse tree, illustrating multiple semantic relationships. In embodiments, the bounding boxes can overlap (e.g., two bounding boxes can include the same semantic type) based on the semantic type groupings. The bounding boxes can designate groups of semantically labeled nodes as having a particular semantic relationship based on the visual appearance of the bounding boxes and/or labels associated with the bounding boxes. In embodiments, bounding boxes designating semantic relationships are drawn to encompass a minimum number of semantically labeled nodes. For example, if a semantic relationship is established between three nodes each having a unique semantic type, then the bounding box would be drawn to encompass the three nodes.

As an example, assume a sentence in a set of natural language content is: "The nurse scheduled surgery on Tuesday at noon." The sentence is first analyzed by the natural language processor 215 (e.g., tagged with parts of speech). Semantic types are then defined for one or more terms within the sentence by the semantic type determiner 218. For example, the word "surgery" could be labeled with the semantic type "procedure," the word "Tuesday" could be labeled with the semantic type "day of week," and the word "noon" could be labeled with the semantic type "time." The parse tree generator 220 then generates a parse tree containing terms within the sentence. The terms are thereafter replaced with visually distinguishable features for each part of speech and semantic type corresponding to each term. The structured unclassified parse tree is then transmitted to the machine learning module 230 for classification. In this example, the machine learning module 230 can output a bounding box designating a semantic relationship "procedure appointment" around the nodes corresponding to the words "surgery," "Tuesday," and "noon."

The machine learning module 230 then dispatches the classified parse tree to the characteristic-to-text mapping module 235. The characteristic-to-text mapping module 235 can be configured to map the classified parse tree containing visually distinguishable nodes to the parse tree representation containing terms. In embodiments, the parse tree containing visually distinguishable nodes can be mapped to its respective parse tree representation containing terms via metadata, a table, or any other suitable method. The characteristic-to-text mapping module 235 then outputs the terms contained in each respective bounding box as an identified semantic relationship. The identified semantic relationship is then dispatched to the device 240. Following the example above, the identified semantic relationship dispatched to the device 240 could be "Input: The nurse scheduled surgery on Tuesday at noon. Identified Semantic Relationship: procedure appointment between the terms surgery, Tuesday, and noon."

Ultimately, the semantic relationship classification system 201 enhances the ability to identify semantic relationships within unstructured natural language content. By converting the natural language text into a visual representation, a vast number of visual recognition and machine learning techniques are available to process the far-reaching number of unstructured text documents. Based on processing constraints, thousands of electronic documents can be parsed, analyzed, and classified within a relatively short amount of time. This enhances the usability of natural language processing systems insofar as they utilize the techniques disclosed herein.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

Referring now to FIG. 3, shown is an example parse tree representation 300 for a sentence: "There was a right breast mass measuring approximately 7.5×7 cm and 4 cm from the axilla." For clarity, FIGS. 3-5 will be described with reference to elements described in FIG. 2.

This sentence can be a portion of NLC transmitted to the data receiving module 210 and forwarded to the natural language processor 215. The natural language processor 215 can then be configured to tag the parts of speech within the sentence, as indicated in the key on the left of FIG. 3 (e.g., verb, noun, article, adjective, adverb, etc.). The natural language processor 215 can then forward the tagged sentence to the parse tree generator 220 such that the parse tree representation 300 can be generated. In this example, each part of speech corresponds to a particular shape, however, in embodiments, the parse tree representation 300 can vary based on size, color, texture, labeling (e.g., metadata or markers applied to the parse tree), or any other suitable method to designate each part of speech within the parse tree representation 300.

Referring now to FIG. 4, shown is an example of a visually distinguishable parse tree representation 400 generated for the sentence: "There was a right breast mass measuring approximately 7.5×7 cm and 4 cm from the axilla." The parse tree representation 300 is transformed into the visually distinguishable parse tree representation 400 based on semantic types determined for one or more terms by the semantic type determiner 218. In this example, the semantic type for the term "breast mass" is determined to be "tumor trigger," the semantic type for the terms "7.5×7 cm" and "4 cm" are determined to be "observation size," and the semantic type for the term "axilla" is determined to be "anatomic area." Each semantic type is designated by a particular texture (e.g., pattern), and the textures replace each word depicted in FIG. 3. The visually distinguishable parse tree representation 400 can then be forwarded to the supervised semantic relationship classifier 225 for manual and/or automatic semantic relationship classification (e.g., to build a supervised training dataset to feed into the machine learning module 230), or alternatively, to the machine learning module 230 for semantic relationship classification (e.g., if the machine learning module 230 is sufficiently trained).

Figure 5:
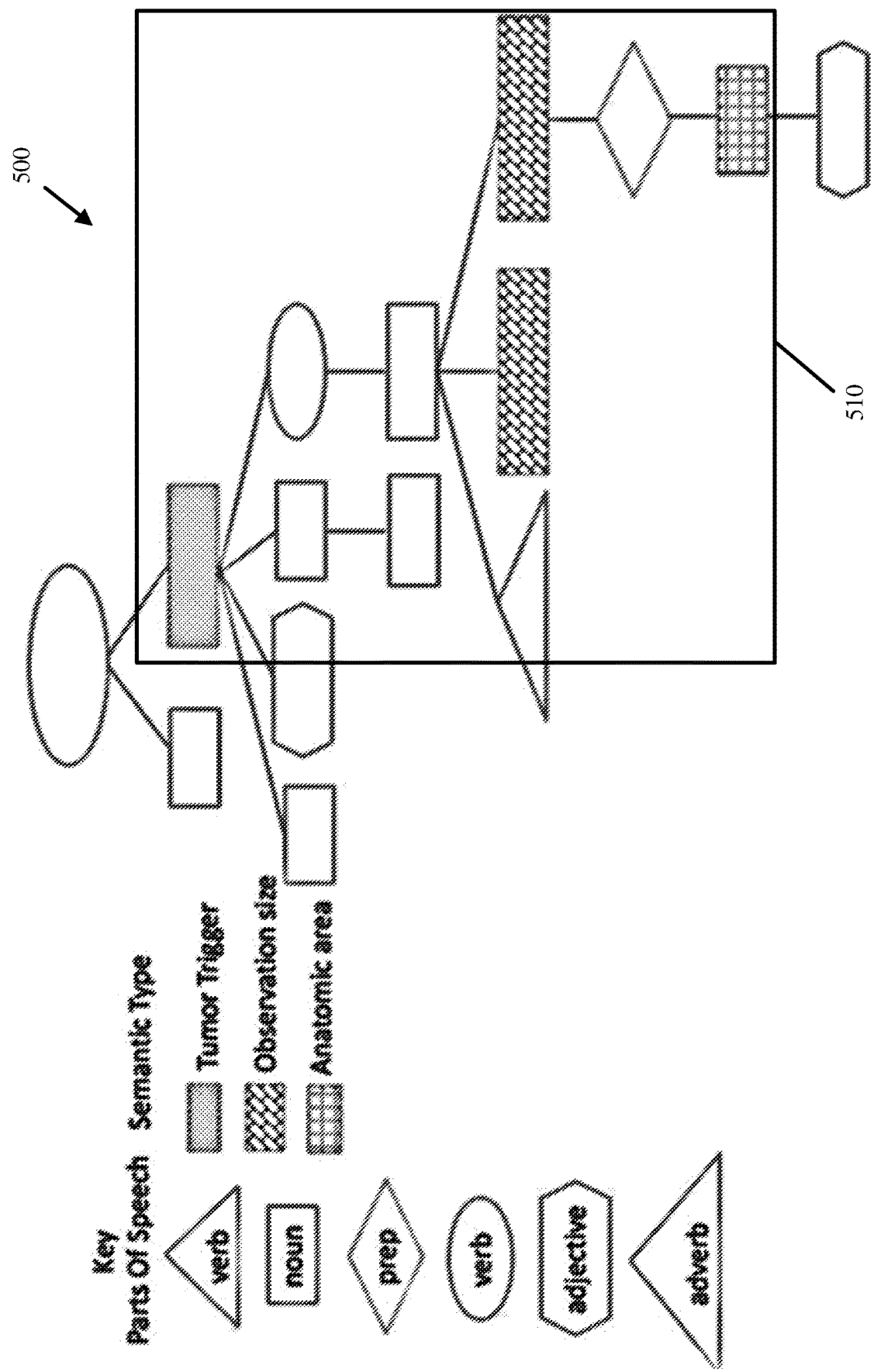
FIG. 5 is an example of a classified parse tree representation, in accordance with embodiments of the present disclosure.

Referring now to FIG. 5, shown is a classified parse tree representation 500 for the sentence: "There was a right breast mass measuring approximately 7.5×7 cm and 4 cm from the axilla" described with reference to FIGS. 3-4. In this example, the machine learning module 230 outputs a bounding box 510 around the semantically labeled nodes (e.g., nodes with a defined semantic type). In particular, the bounding box 510 is placed to encompass the nodes corresponding to the terms "breast mass," "7.5×7 cm," "4 cm," and "axilla." In this example, the bounding box 510 designates the semantic relationship "tumor measurement." In embodiments, the bounding box 510 can be sized, shaped, colored, or textured to be distinguishable from one or more other bounding boxes disposed on the classified parse tree representation 500. After the bounding boxes are output by the machine learning module 230, the portions of text included in each bounding box are dispatched to the characteristic-to-text mapping module 235 such that the text associated with each classification can be identified and output.

Though FIGS. 3-5 depict an example classification of a semantic relationship "tumor measurement," in embodiments, any other semantic relationship (e.g., planned procedure, drug administration plan, financial plan, diagnosis, etc.) can be identified.

Figure 6:
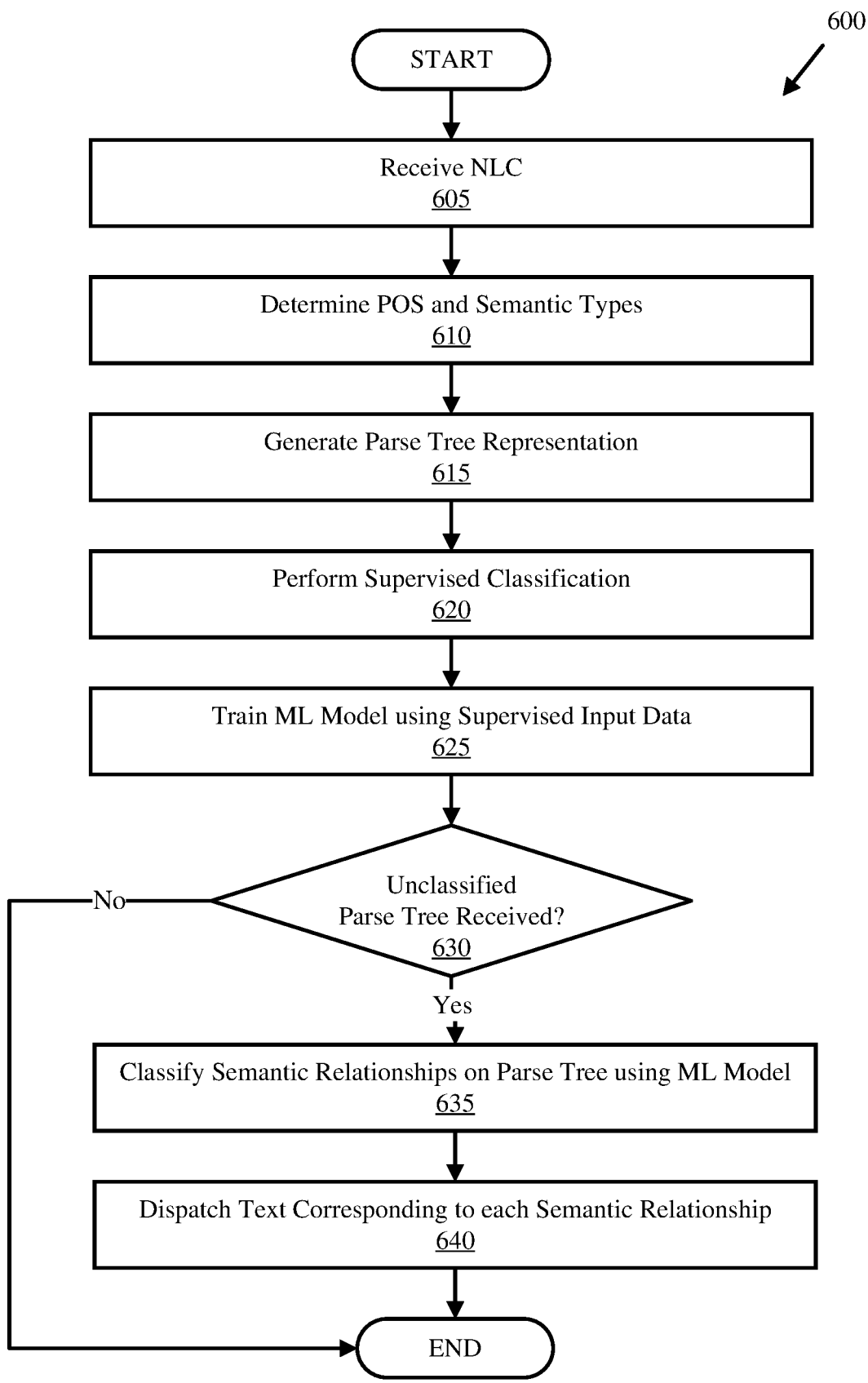
FIG. 6 is a flow diagram illustrating an example method for classifying semantic relationships using visual recognition, in accordance with embodiments of the present disclosure.

FIG. 6 is a flow diagram illustrating an example method 600 for classifying semantic relationships within natural language content using visual recognition, in accordance with embodiments of the present disclosure.

Method 600 initiates at operation 605, where NLC is received. NLC can be received over a network by one or more devices. NLC can include various forms of electronic documents (e.g., scanned hard-copies of documents, electronic encyclopedias, electronic journals, text files, social media data, lab reports, website data, application data, etc.). In some embodiments, NLC can be extracted from audio recordings, images, and/or video input. Data can be received using the same, or substantially similar, techniques described with respect to the data receiving module 210 of FIG. 2.

The NLC is then analyzed to determine parts of speech and semantic types. This is illustrated at operation 610. Analyzing NLC via natural language processing can be completed using the same, or substantially similar, techniques described with respect to the natural language processor 215 and semantic type determiner 218 of FIG. 2 (e.g., tokenization, part of speech tagging, semantic type determination, etc.).

A parse tree representation is then generated for the analyzed NLC. This is illustrated at operation 615. For example, based on the parts of speech and/or semantic types tagged on each term within the NLC, a visually distinguishable parse tree representation can be generated (e.g., See FIG. 4). In some embodiments, parse tree representations can be generated in a scalable vector graphics (SVG) file. However, the parse tree representation can be generated and/or reformatted into any other suitable file format (e.g., jpeg, tiff, etc.). The parse tree representation can be generated using the same, or substantially similar, techniques described with respect to the parse tree generator 220 of FIG. 2.

Supervised classification is then completed on the parse tree representation. This is illustrated at operation 620. Supervised classification can be completed using the same or substantially similar techniques described with respect to the supervised semantic relationship classifier 225 of FIG. 2 (e.g., manually by an expert). Classification can include drawing bounding boxes designating semantic relationships around semantically labeled nodes. However, classification can include any other suitable method of designating semantic relationships (e.g., labeling, storing classifications in a data structure, etc.).

A machine learning model is then trained using supervised input data (e.g., received from operation 620). This is illustrated at operation 625. The machine learning model can be trained using the same, or substantially similar, techniques described with respect to the machine learning module 230 of FIG. 2 (e.g., linear regression, logistic regression, naive Bayes, neural networks, similarity learning, pattern recognition, decision trees, k-nearest neighbor, linear discriminant analysis, quadratic discriminant analysis, clustering, hidden Markov models (HMMs), conditional random fields (CRFs) and support vector machines). The machine learning module can be trained based on pixel data of the various parse tree representations (e.g., SVG images). This enables the machine learning module to automatically classify (e.g., draw bounding boxes around) semantic relationships within visually distinguishable parse tree representations.

A determination is then made whether an unclassified parse tree is received. This is illustrated at operation 630. If no unclassified parse trees are received, then method 600 ends ("NO" at operation 630). If an unclassified parse tree is received, then method 600 proceeds to operation 635, where the parse tree is classified using the machine learning (ML) model ("YES" at operation 630). The ML model then classifies (e.g., by drawing bounding boxes, labeling, storing identifications, etc.) semantic relationships associated with semantic type groupings. The classification can be completed using the same, or substantially similar, techniques with respect to the machine learning module 230 of FIG. 2.

The text corresponding to the semantic relationship is then extracted and dispatched. This is illustrated at operation 640. For example, the visually distinguishable parse tree representation can be mapped back to the actual sentence the parse tree was generated on, and then the classified terms can be transmitted (e.g., to a user device, storage device, or for display on a graphical user interface (GUI)). The mapping can be completed using the same, or substantially similar, techniques described with respect to the characteristic-to-text mapping module 235 of FIG. 2.

The aforementioned operations can be completed in any order and are not limited to those described. Additionally, some, all, or none of the aforementioned operations can be completed, while still remaining within the spirit and scope of the present disclosure.

Figure 7:
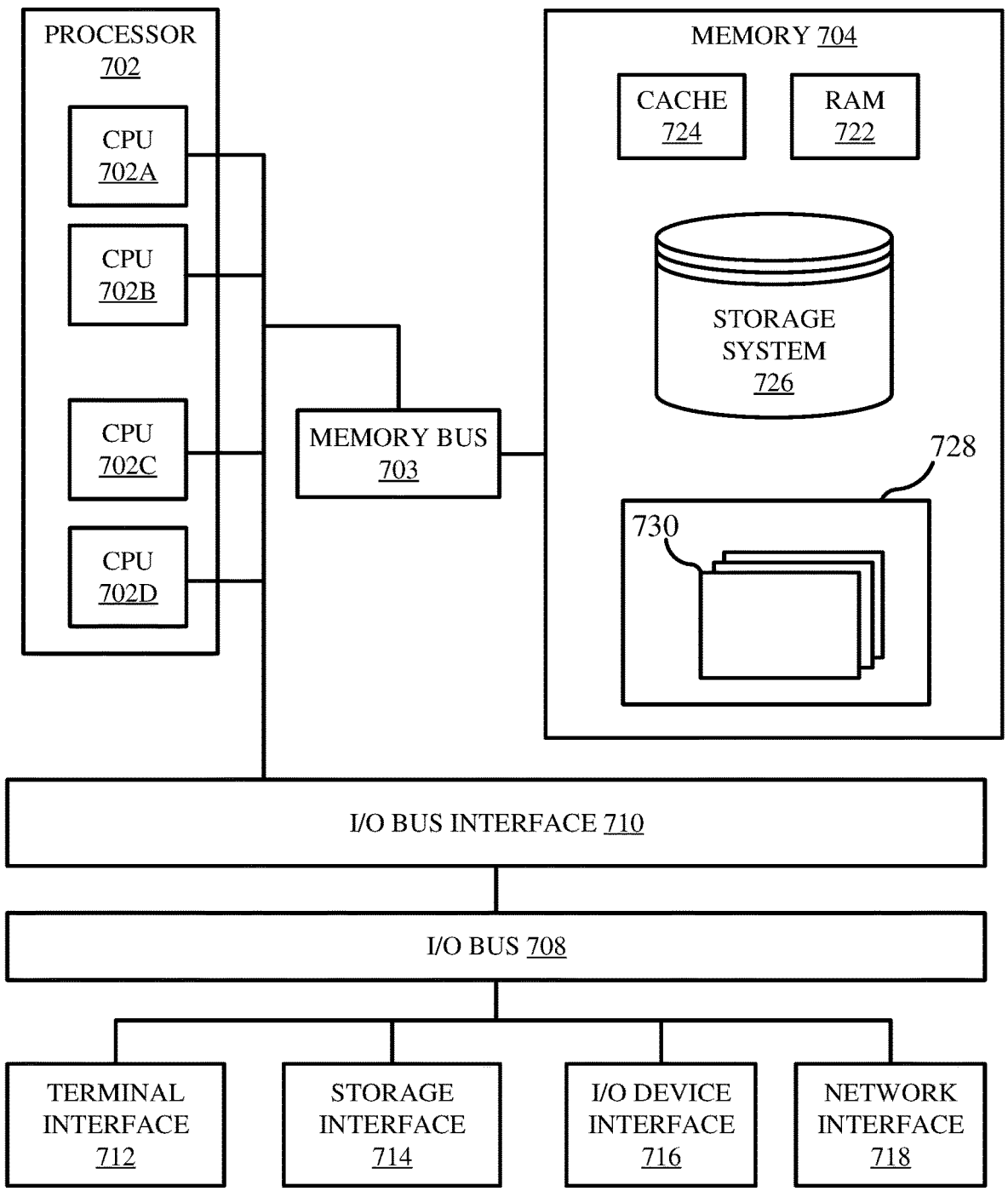
FIG. 7 is a high-level block diagram illustrating an example computer system that can be used in implementing one or more of the methods, tools, and modules, and any related functions described herein, in accordance with embodiments of the present disclosure.

Referring now to FIG. 7, shown is a high-level block diagram of an example computer system 701 (e.g., devices 105, server 135, device 205, device 240, semantic relationship classification system 201) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "USB thumb drive" or "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 728 and/or program modules 730 generally perform the functions or methodologies of various embodiments.

In some embodiments, the program modules 730 of the computer system 701 include a semantic relationship classification module. The semantic relationship classification module can be configured to receive and analyze natural language content. The span classification can determine parts of speech and semantic types of respective words within the natural language content, and then build a parse tree representation of the natural language content. In embodiments, the parse tree representation can include visually distinguishable characteristics for each node dependent on the part of speech and semantic type for each word. The semantic relationship identification module can further be configured to generate a bounding box identifying a semantic relationship around a set of nodes on the parse tree representation by a machine learning model. In embodiments, the semantic relationship identification module can train the machine learning model based on supervised learning data including pre-classified parse trees (e.g., parse trees having bounding boxes identifying particular semantic relationships for semantic type groupings).

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
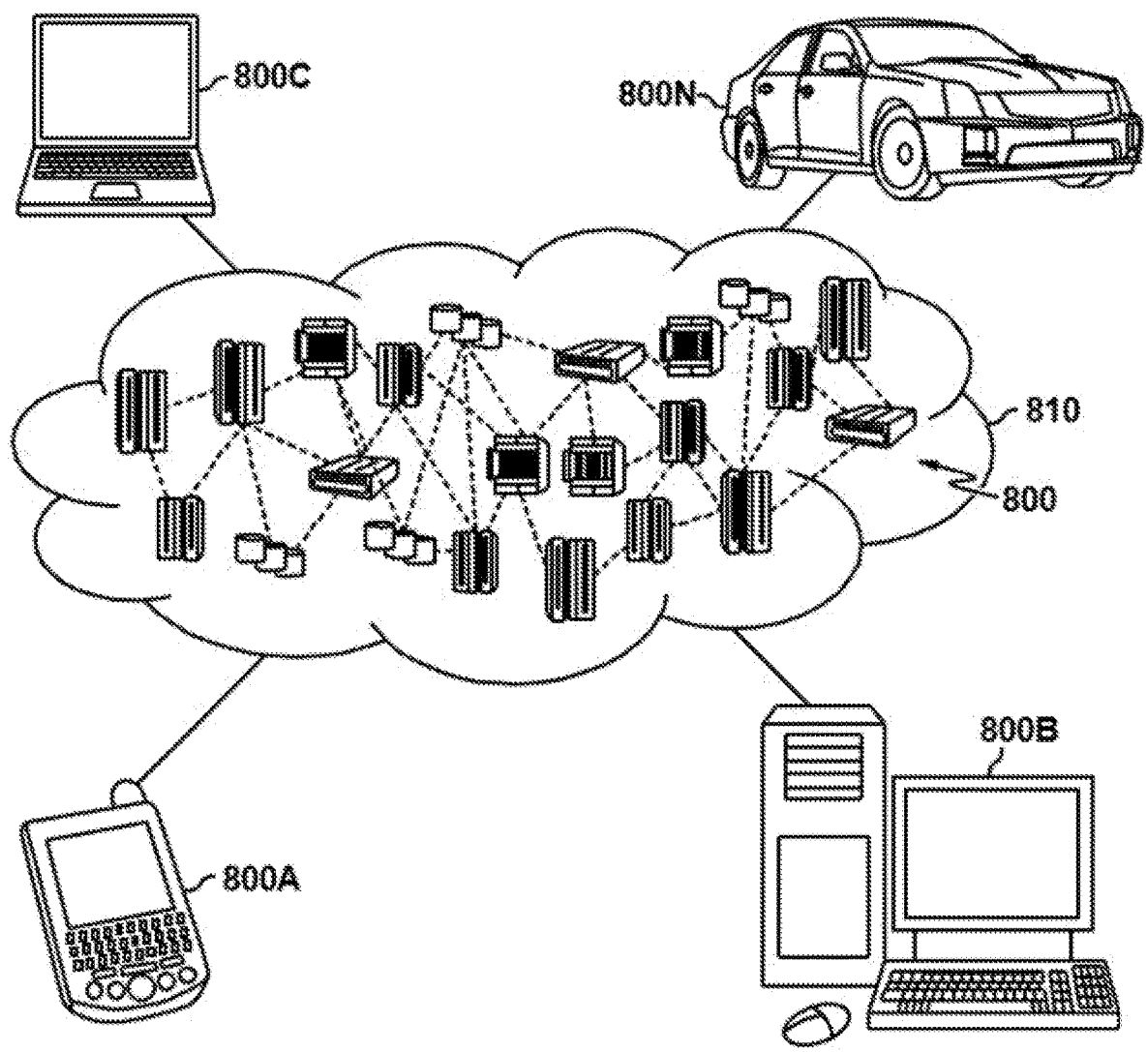
FIG. 8 is a diagram illustrating a cloud computing environment, in accordance with embodiments of the present disclosure.

Referring now to FIG. 8, illustrative cloud computing environment 810 is depicted. As shown, cloud computing environment 810 includes one or more cloud computing nodes 800 with which local computing devices used by cloud consumers, such as, for example, personal digital assistant (PDA) or cellular telephone 800A (e.g., devices 105, device 205, device 240, semantic relationship classification system 201), desktop computer 800B (e.g., devices 105, server 135, device 205, device 240, semantic relationship system 201) laptop computer 800C (e.g., devices 105, device 205, device 240, semantic relationship system 201), and/or automobile computer system 800N can communicate. Nodes 800 can communicate with one another. They can be grouped (not shown) physically or virtually, in one or more networks, such as Private, Community, Public, or Hybrid clouds as described hereinabove, or a combination thereof. This allows cloud computing environment 810 to offer infrastructure, platforms and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
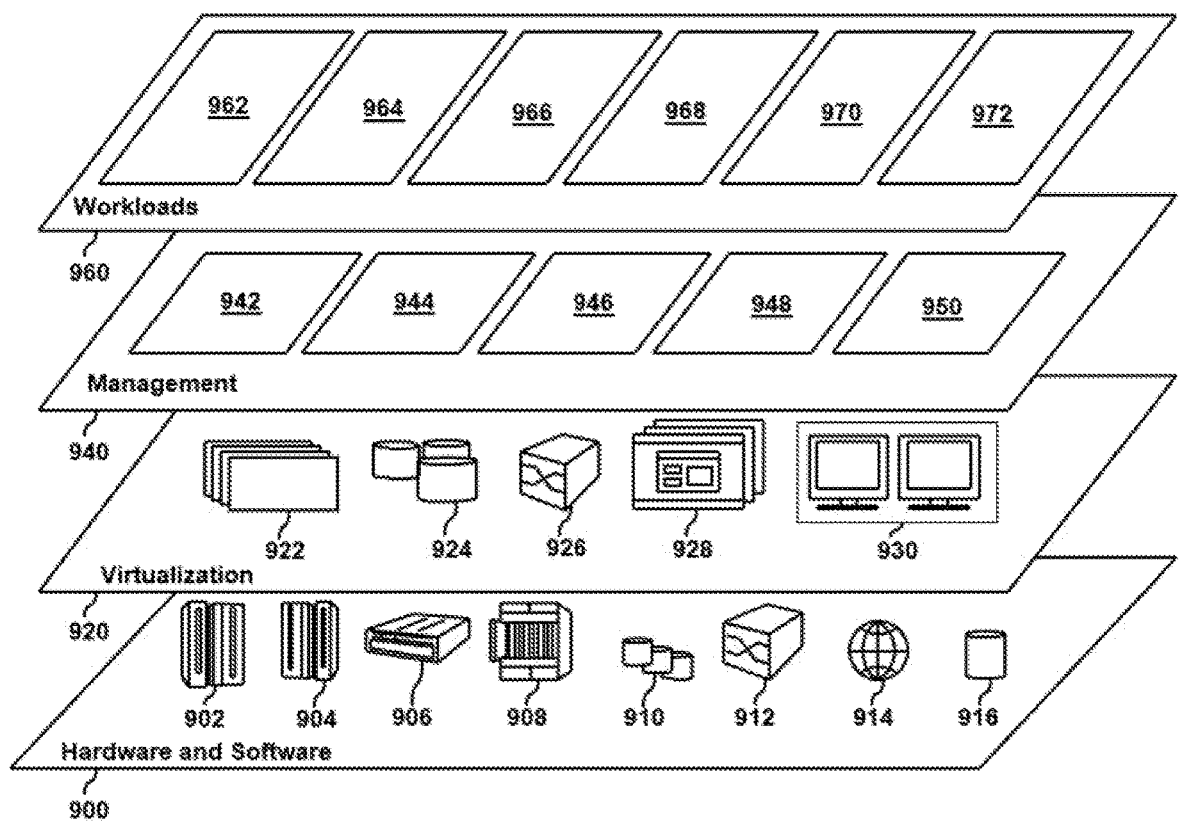
FIG. 9 is a block diagram illustrating abstraction model layers, in accordance with embodiments of the present disclosure.

Referring now to FIG. 9, a set of functional abstraction layers provided by cloud computing environment 810 (FIG. 8) is shown. It should be understood in advance that the components, layers, and functions shown in FIG. 9 are intended to be illustrative only and embodiments of the disclosure are not limited thereto. As depicted below, the following layers and corresponding functions are provided.

Hardware and software layer 900 includes hardware and software components. Examples of hardware components include: mainframes 902; RISC (Reduced Instruction Set Computer) architecture based servers 904; servers 906; blade servers 908; storage devices 910; and networks and networking components 912. In some embodiments, software components include network application server software 914 and database software 916.

Virtualization layer 920 provides an abstraction layer from which the following examples of virtual entities can be provided: virtual servers 922; virtual storage 924; virtual networks 926, including virtual private networks; virtual applications and operating systems 928; and virtual clients 930.

In one example, management layer 940 can provide the functions described below. Resource provisioning 942 provides dynamic procurement of computing resources and other resources that are utilized to perform tasks within the cloud computing environment. For example, resource provisioning 942 can allocate additional computing resources to devices (e.g., devices 105, device 205, device 240, semantic relationship system 201) which are indicated to have high activity. Metering and Pricing 944 provide cost tracking as resources are utilized within the cloud computing environment, and billing or invoicing for consumption of these resources. In one example, these resources can include application software licenses. In some embodiments, Metering and Pricing 944 indicates the number of allotted licenses to machines in the system. Security provides identity verification for cloud consumers and tasks, as well as protection for data and other resources. User portal 946 provides access to the cloud computing environment for consumers and system administrators. Service level management 948 provides cloud computing resource allocation and management such that required service levels are met. Service Level Agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment can be utilized. Examples of workloads and functions which can be provided from this layer include: mapping and navigation 962; image processing 964; natural language processing 966; classification 968; transaction processing 970; and data analytics processing 972.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   receiving natural language content;
   determining, by analyzing the natural language content using a natural language processor, a part of speech of respective terms within the natural language content;
   determining a semantic type for each of at least two terms within the natural language content;
   generating a parse tree representation containing a plurality of nodes based on the natural language content, each of the plurality of nodes corresponding to at least one term within the natural language content, wherein visual characteristics of respective nodes of the plurality of nodes within the parse tree representation depend on the part of speech and semantic type of the respective terms; and
   generating, by a machine learning model, a bounding box identifying a semantic relationship around a set of nodes on the parse tree representation, the set of nodes including the at least two terms, wherein the machine learning model is trained using a set of pre-classified parse tree representations.

2. The method of claim 1, wherein the semantic type for each of the at least two terms is determined based on a table mapping words to semantic types.

3. The method of claim 1, wherein the set of pre-classified parse tree representations is manually labeled with one or more semantic relationships using bounding boxes around semantic type groupings.

4. The method of claim 1, wherein the machine learning model is a region-based convolutional neural network.

5. The method of claim 1, wherein distinct parts of speech are represented by distinct shapes within the parse tree representation and wherein distinct semantic types are represented by distinct textures within the parse tree representation.

6. The method of claim 1, further comprising:
   displaying the semantic relationship along with the two or more terms and their respective semantic types on a graphical user interface (GUI).

7. A system comprising:
   a computer-readable storage medium storing instructions, which, when executed by a processor, is configured to cause the processor to perform a method comprising:
   receiving natural language content;
   determining, by analyzing the natural language content using a natural language processor, a part of speech of respective terms within the natural language content;
   determining a semantic type for each of at least two terms within the natural language content;
   generating a parse tree representation containing a plurality of nodes based on the natural language content, each of the plurality of nodes corresponding to at least one term within the natural language content, wherein visual characteristics of respective nodes of the plurality of nodes within the parse tree representation depend on the part of speech and semantic type of the respective terms; and
   generating, by a machine learning model, a bounding box identifying a semantic relationship around a set of nodes on the parse tree representation, the set of nodes including the at least two terms, wherein the machine learning model is trained using a set of pre-classified parse tree representations.

8. The system of claim 7, wherein the semantic type for each of the at least two terms is manually determined.

9. The system of claim 7, wherein the method performed by the processor further comprises:
   generating a second bounding box identifying a second semantic relationship around a second set of nodes on the parse tree representation.

10. The system of claim 9, wherein the bounding box has a first visual characteristic, wherein the second bounding box has a second visual characteristic.

11. The system of claim 9, wherein the second semantic relationship is displayed to a graphical user interface (GUI) along with terms corresponding to the second set of nodes on the parse tree representation.

12. The system of claim 7, wherein the machine learning model is a region-based convolutional neural network trained using a set of pre-classified parse tree representations, the set of pre-classified parse tree representations manually labeled with semantic relationships by drawing bounding boxes around semantic type groupings.

13. The system of claim 7, wherein distinct parts of speech are represented by distinct shapes within the parse tree representation and wherein distinct semantic types are represented by distinct textures within the parse tree representation.

14. A computer program product comprising a computer readable storage medium having program instructions embodied therewith, wherein the computer readable storage medium is not a transitory signal per se, the program instructions executable by a processor to cause the processor to perform a method comprising:

receiving natural language content;

determining, by analyzing the natural language content using a natural language processor, a part of speech of respective terms within the natural language content;

determining a semantic type for each of at least two terms within the natural language content;

generating a parse tree representation containing a plurality of nodes based on the natural language content, each of the plurality of nodes corresponding to at least one term within the natural language content, wherein visual characteristics of respective nodes of the plurality of nodes within the parse tree representation depend on the part of speech and semantic type of the respective terms; and generating, by a machine learning model, a bounding box identifying a semantic relationship around a set of nodes on the parse tree representation, the set of nodes including the at least two terms, wherein the machine learning model is trained using a set of pre-classified parse tree representations.

15. The computer program product of claim 14, wherein the semantic type for each of the at least two terms is determined based on a table mapping words to semantic types.

16. The computer program product of claim 14, wherein the set of pre-classified parse tree representations is manually labeled with one or more semantic relationships using bounding boxes around semantic type groupings.

17. The computer program product of claim 14, wherein the machine learning model is a region-based convolutional neural network.

18. The computer program product of claim 14, wherein distinct parts of speech are represented by distinct shapes within the parse tree representation and wherein distinct semantic types are represented by distinct textures within the parse tree representation.

* * * * *